(12) United States Patent
McColloch

(10) Patent No.: US 9,086,547 B2
(45) Date of Patent: Jul. 21, 2015

(54) MULTI-OPTICAL FIBER CONNECTOR MODULE HAVING A COVER COMPRISING UNFILLED PLASTIC HAVING DEFORMABLE FEATURES FORMED THEREIN, AND A METHOD

(75) Inventor: Laurence R. McColloch, Santa Clara, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 532 days.

(21) Appl. No.: 13/596,473

(22) Filed: Aug. 28, 2012

(65) Prior Publication Data
US 2014/0064666 A1 Mar. 6, 2014

(51) Int. Cl.
*G02B 6/38* (2006.01)
(52) U.S. Cl.
CPC ............ *G02B 6/3839* (2013.01); *G02B 6/3865* (2013.01); *Y10T 29/49826* (2015.01)
(58) Field of Classification Search
None
See application file for complete search history.

(56) References Cited

U.S. PATENT DOCUMENTS

| | | | |
|---|---|---|---|
| 5,892,870 A | 4/1999 | Fingler et al. | |
| 5,907,651 A | 5/1999 | Bunin et al. | |
| 6,085,003 A | 7/2000 | Knight | |
| 6,594,436 B2 | 7/2003 | Sun et al. | |
| 6,860,645 B2 | 3/2005 | Miller et al. | |
| 6,918,703 B2 | 7/2005 | Chen et al. | |
| 6,931,195 B2 | 8/2005 | Lemoff | |
| 7,003,869 B2 | 2/2006 | Lutzen et al. | |
| 7,197,224 B2 * | 3/2007 | Rolston et al. | 385/137 |
| 7,220,065 B2 | 5/2007 | Han et al. | |
| 7,280,733 B2 | 10/2007 | Larson et al. | |
| 7,543,994 B2 | 6/2009 | McColloch | |
| 7,553,091 B2 | 6/2009 | McColloch | |
| 7,794,156 B2 | 9/2010 | Wang et al. | |
| 7,905,751 B1 | 3/2011 | Davis | |
| 8,002,477 B2 | 8/2011 | Colgan et al. | |
| 8,036,500 B2 | 10/2011 | McColloch | |
| 2008/0095502 A1 | 4/2008 | McColloch | |
| 2010/0220953 A1 | 9/2010 | Kewitsch et al. | |

FOREIGN PATENT DOCUMENTS

| | | |
|---|---|---|
| CN | 201796164 U | 4/2011 |
| JP | 2006010871 A | 1/2006 |

OTHER PUBLICATIONS

MTP Solutions for High Density Networks, 2010, p. 1-22, FireFab, United Kingdom.

* cited by examiner

*Primary Examiner* — Mike Stahl
*Assistant Examiner* — Hoang Tran

(57) ABSTRACT

A multi-optical fiber connector module is provided with an unfilled plastic cover that is used to secure the ends of a plurality of optical fibers at precise locations within the connector modules. The cover has deformable features that permanently deform when the cover is secured to a housing of the connector module. The permanent deformations are caused by forces that are exerted on the deformable features by respective unjacketed optical fibers when the cover is secured to the module housing. When the features deform, they partially wrap about the respective unjacketed optical fibers such that the respective fibers are pinned between the respective deformed features and the respective V-shaped grooves of the module housing. This contact between the deformed features, the respective unjacketed optical fibers and the respective V-shaped grooves maintains the respective unjacketed optical fibers in precise locations along respective optical pathways of the connector module.

18 Claims, 10 Drawing Sheets

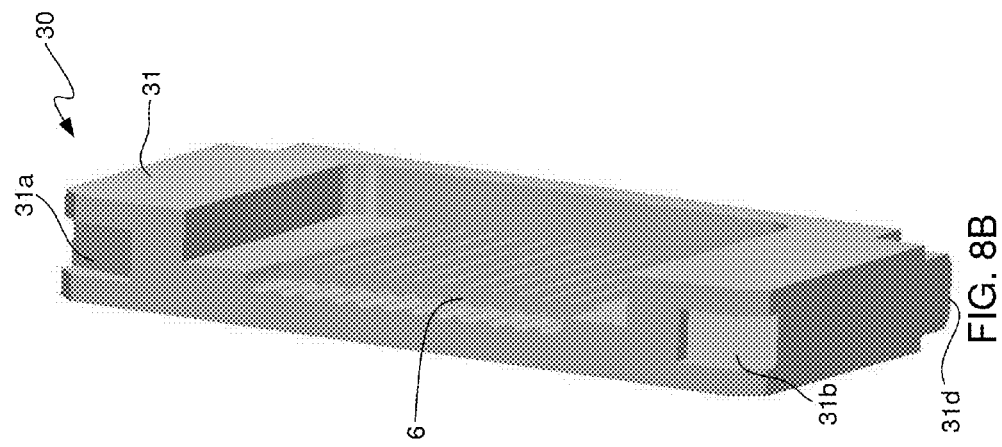
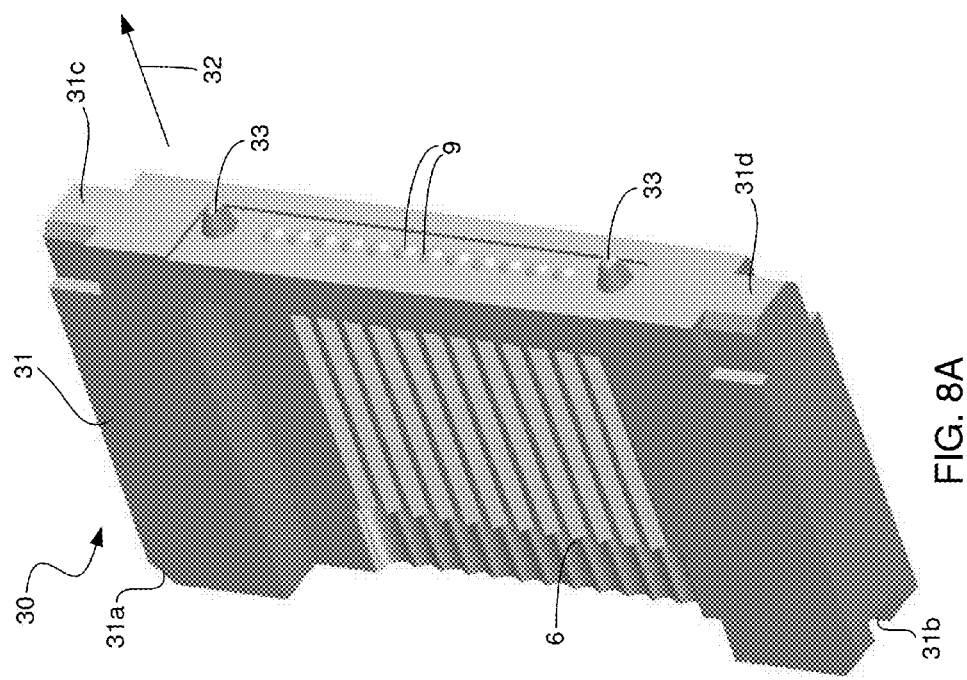
FIG. 8B
FIG. 8A

MULTI-OPTICAL FIBER CONNECTOR MODULE HAVING A COVER COMPRISING UNFILLED PLASTIC HAVING DEFORMABLE FEATURES FORMED THEREIN, AND A METHOD

TECHNICAL FIELD OF THE INVENTION

The invention relates to optical communications. More particularly, the invention relates to multi-optical fiber connector modules used in optical communications networks.

BACKGROUND OF THE INVENTION

Multi-optical fiber connector modules are used to mechanically couple the ends of a plurality of optical fibers to a parallel optical communications module that has a plurality of optical channels. The parallel optical communications module may be a parallel optical transceiver module having both transmit and receive optical channels, a parallel optical transmitter module having only transmit optical channels, or a parallel optical receiver module having only receive optical channels. A typical multi-optical fiber connector module includes an optics system that couples light between the ends of the optical fibers and respective optoelectronic devices that are contained within the parallel optical communications module. For transmit optical channels, the optoelectronic devices are electrical-to-optical converters such as laser diodes or light-emitting diodes (LEDs). For receive optical channels, the optoelectronic devices are optical-to-electrical converters such as photodiodes.

The multi-optical fiber connector modules and the parallel optical communications modules typically have mating features on them that allow the multi-optical fiber connector modules to be fixedly or removably mechanically coupled to one another. A variety of multi-optical fiber connector modules and parallel optical communications modules exist in the market today that are designed to mate with one another in a way that optically aligns the optical pathways between the ends of the optical fibers and the ends of the respective optoelectronic devices to enable optical data signals to be coupled between ends of the optical fibers and the respective optoelectronic devices. In designing and manufacturing the multi-optical fiber connector modules and the corresponding parallel optical communications modules, great care is taken to ensure that once the modules are mated together, very precise optical alignment exists along the optical pathways.

A variety of passive and active optical alignment techniques and tools are used today to provide the precise optical alignment that is needed to prevent unacceptable optical losses from occurring. Unacceptable optical losses lead to signal degradation, which can lead to an unacceptable bit error rate (BER). When the multi-optical fiber connector modules and the corresponding parallel optical communications modules are manufactured, the manufacturing tolerances typically must be extremely tight in order to ensure that very precise optical alignment exists along the optical pathways when the modules are mechanically coupled to one another in their ultimate relative positions and orientations. Otherwise, the optical alignment along the optical pathways will not have sufficient precision to prevent unacceptable optical losses from occurring.

Many multi-optical fiber connector modules are designed and manufactured to include passive alignment features, such as key/keyway mating features, which guide the modules into optical alignment with one another as they are mechanically coupled together. The passive alignment features engage one another, or mate, to bring the optical pathways of the connector modules into fine, or precise, optical alignment.

Within the multi-optical fiber connector modules, the ends of a plurality of optical fibers are held in fixed positions along the optical pathways. The positioning of the ends of the optical fibers must be very precise in order to ensure very high optical coupling efficiency. If the ends of the fibers are not precisely positioned at the correct locations within the connector module, unacceptable optical losses may occur, leading to signal degradation and an unacceptable BER.

SUMMARY OF THE INVENTION

The invention is directed to a multi-optical fiber connector module that uses an unfilled plastic cover and a method. The connector module comprises a module housing having a cavity formed therein for holding ends of a plurality of optical fibers. The cavity has a plurality of V-shaped grooves formed in a lower surface thereof for holding an unjacketed portion of an optical fiber. Each unjacketed fiber portion has a cleaved end. The cover comprises an unfilled plastic molded part having a plurality of deformable features disposed on a lower surface thereof. The cover has a shape that is adapted to fit within the cavity such that the deformable features come into contact with the unjacketed portions of optical fibers disposed within the cavity. When the cover is positioned within the cavity, the deformable features permanently deform about the respective unjacketed portions of the optical fibers at locations where the deformable features come into contact with the unjacketed fiber portions such that the unjacketed portions are precisely located between the permanently deformed features and the respective V-shaped grooves.

The method comprises: providing a module housing having a cavity formed therein for holding cleaved ends of a plurality of optical fibers in V-shaped grooves formed in a lower surface of the cavity; and positioning an unfilled plastic molded cover having a plurality of deformable features disposed on a lower surface thereof in the cavity. When the cover is positioned within the cavity, the deformable features permanently deform about the respective unjacketed portions of the optical fibers at locations where the deformable features come into contact with the unjacketed fiber portions such that the unjacketed portions are precisely located between the permanently deformed features and the respective V-shaped grooves.

These and other features and advantages of the invention will become apparent from the following description, drawings and claims.

BRIEF DESCRIPTION OF THE DRAWINGS

FIGS. 8A and 8B illustrate front and back perspective views, respectively, of a multi-optical fiber connector module in accordance with another illustrative embodiment.

DETAILED DESCRIPTION OF AN ILLUSTRATIVE EMBODIMENT

Figure 1:
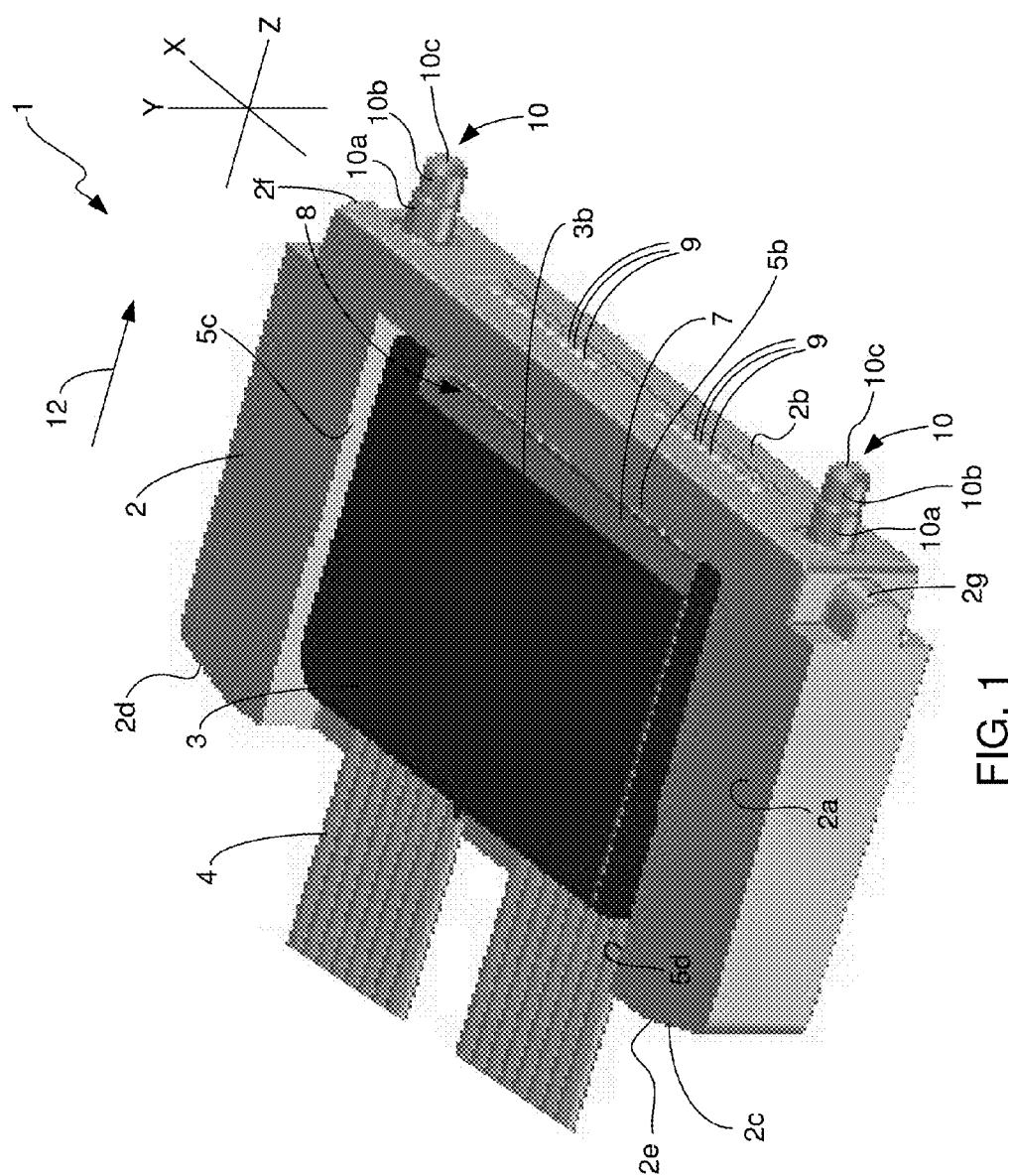
FIG. 1 illustrates a side perspective view of a multi-optical fiber connector module in accordance with an illustrative embodiment.

In accordance with embodiments of the invention, a multi-optical fiber connector module is provided that uses an unfilled plastic cover having deformable features thereon to secure the ends of a plurality of optical fibers at precise locations within the connector modules. The deformable features that deform when the cover is coupled to a housing of the connector module. The deformations are caused by forces that are exerted on the deformable features of the cover by respective unjacketed optical fibers when the cover is secured to the module housing. When the deformable features deform, they partially wrap about the respective unjacketed optical fibers such that the respective fibers are pinned between the respective deformed features and the respective V-shaped grooves of the module housing. This contact between the deformed features, the respective unjacketed optical fibers and the respective V-shaped grooves precisely locates the respective unjacketed optical fibers along respective optical pathways of the connector module.

Examples of multi-optical fiber connector modules that are configured for use with the cover of the invention will be described with reference to FIGS. 1-8B. An illustrative embodiment of a cover that is used with the connector modules will be described with reference to FIGS. 9A-11B. Like reference numbers in the figures represent like elements, features, or components. The features in the drawings are not necessarily drawn to scale.

Figure 2:
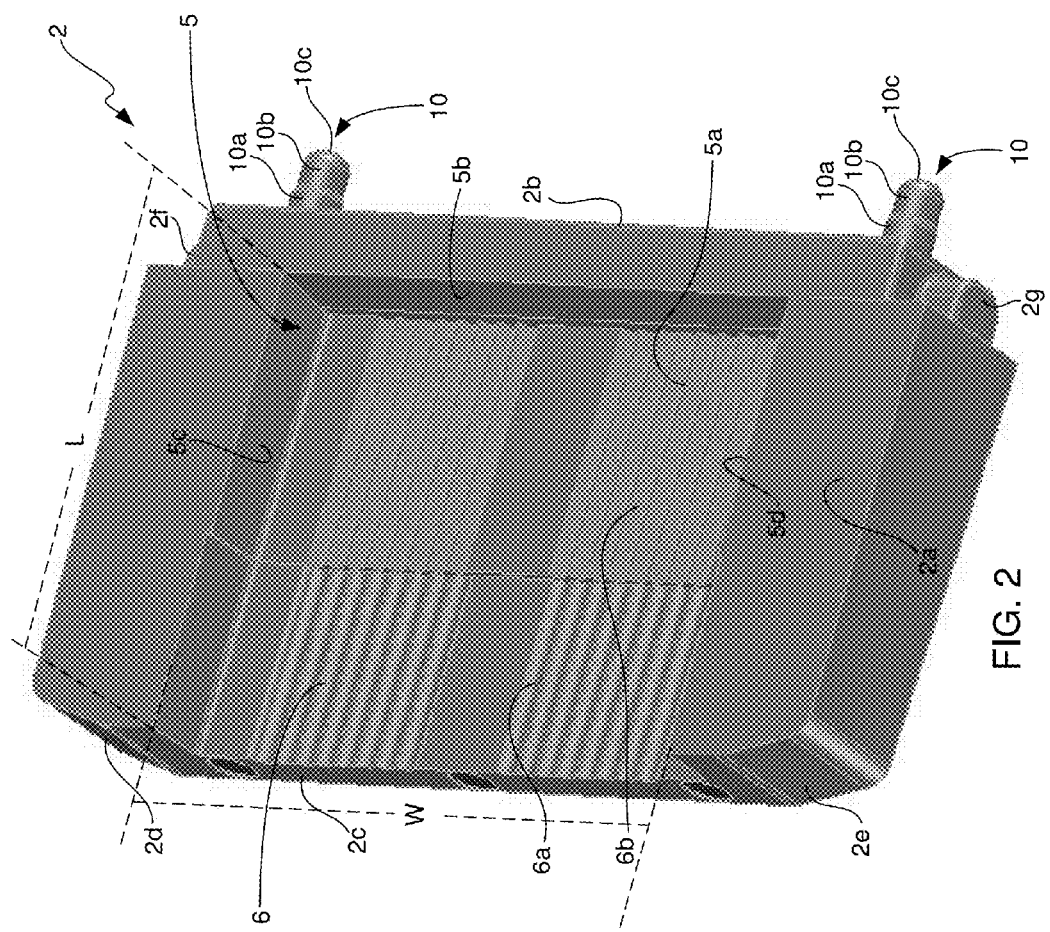
FIG. 2 illustrates a top perspective view of the module housing of the connector module shown in FIG. 1 with the cover and the optical fibers removed.
Figure 3:
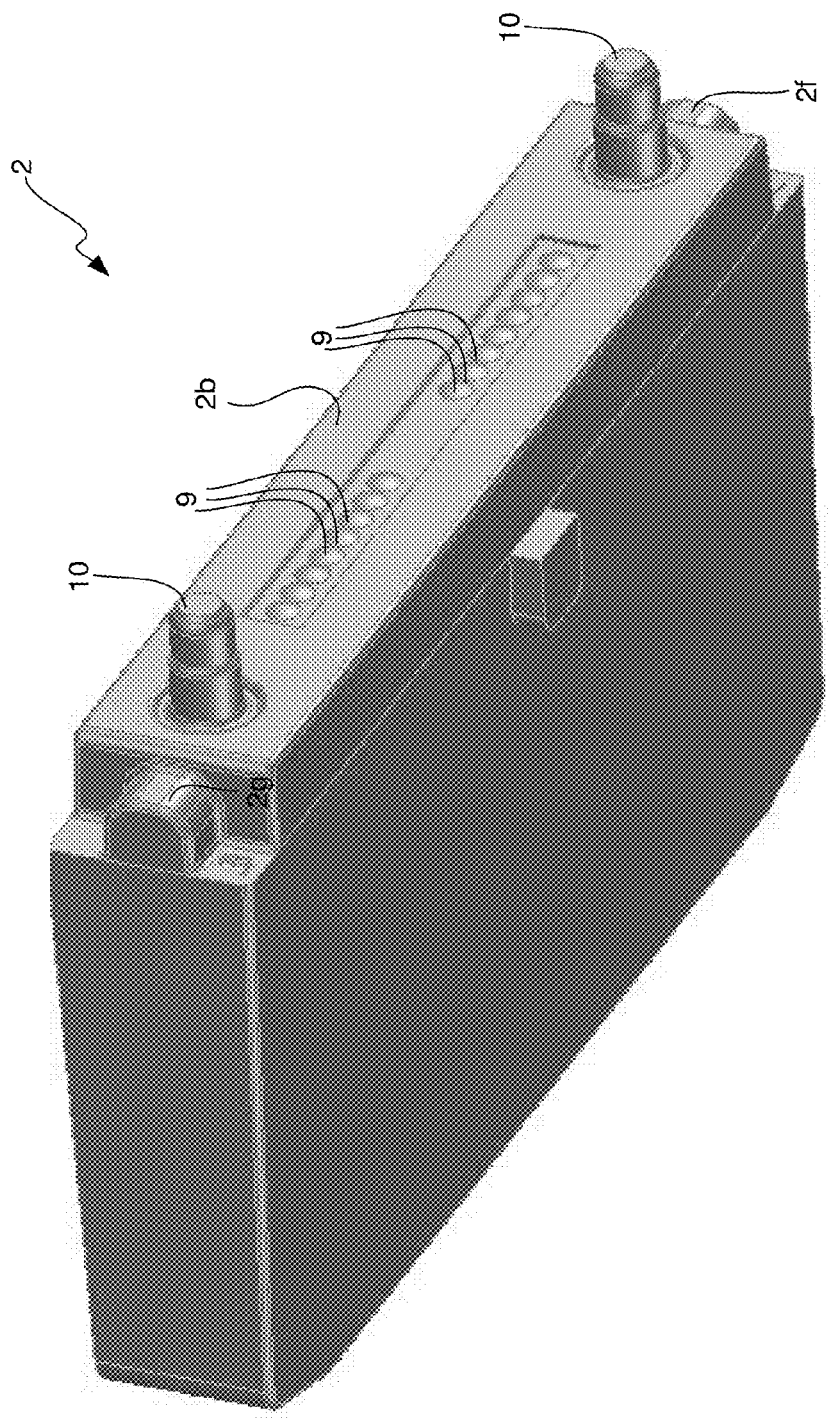
FIG. 3 illustrates a bottom perspective view of the module housing shown in FIG. 2.
Figure 4:
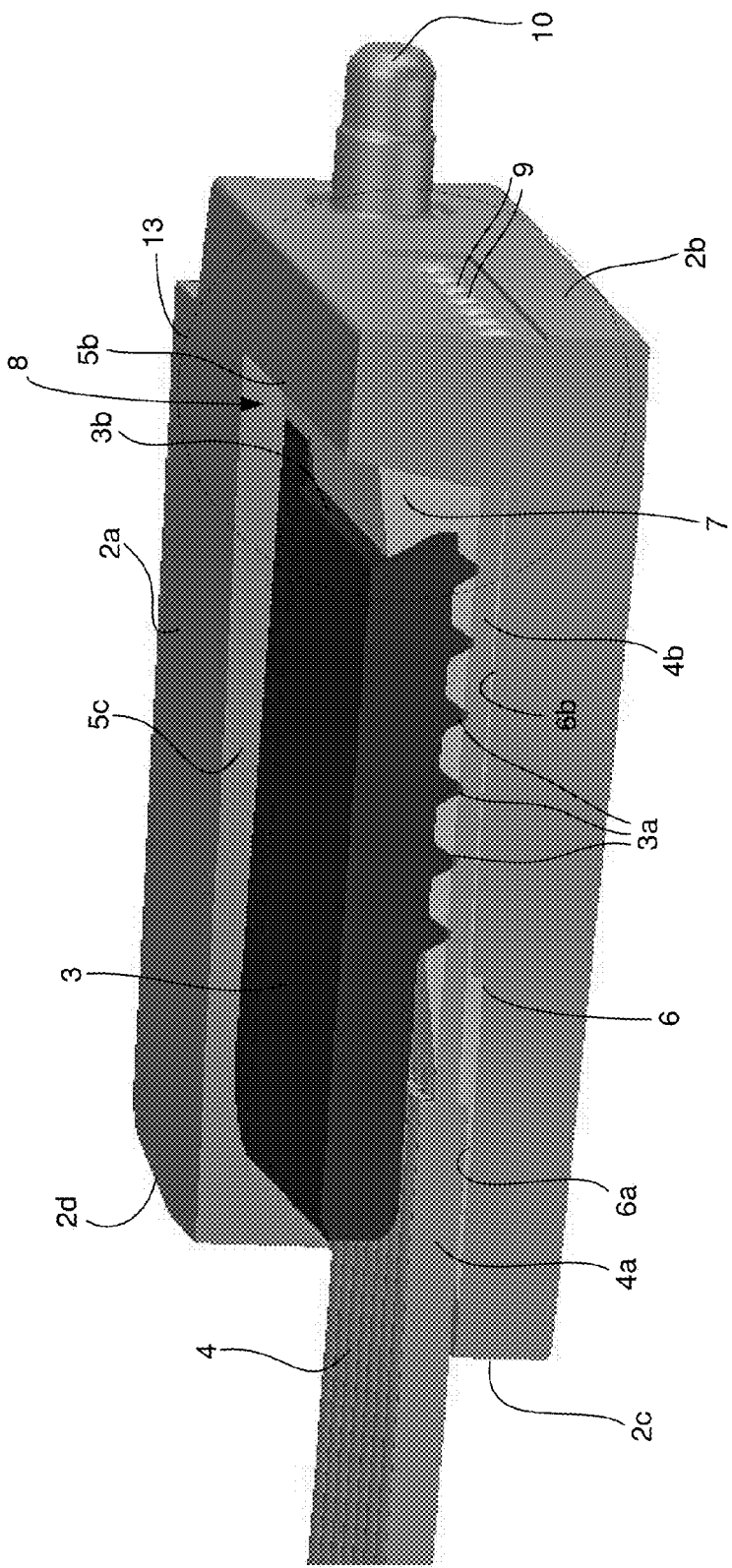
FIG. 4 illustrates a cross-sectional side perspective view of the multi-optical fiber connector module shown in FIG. 1.
Figure 5:
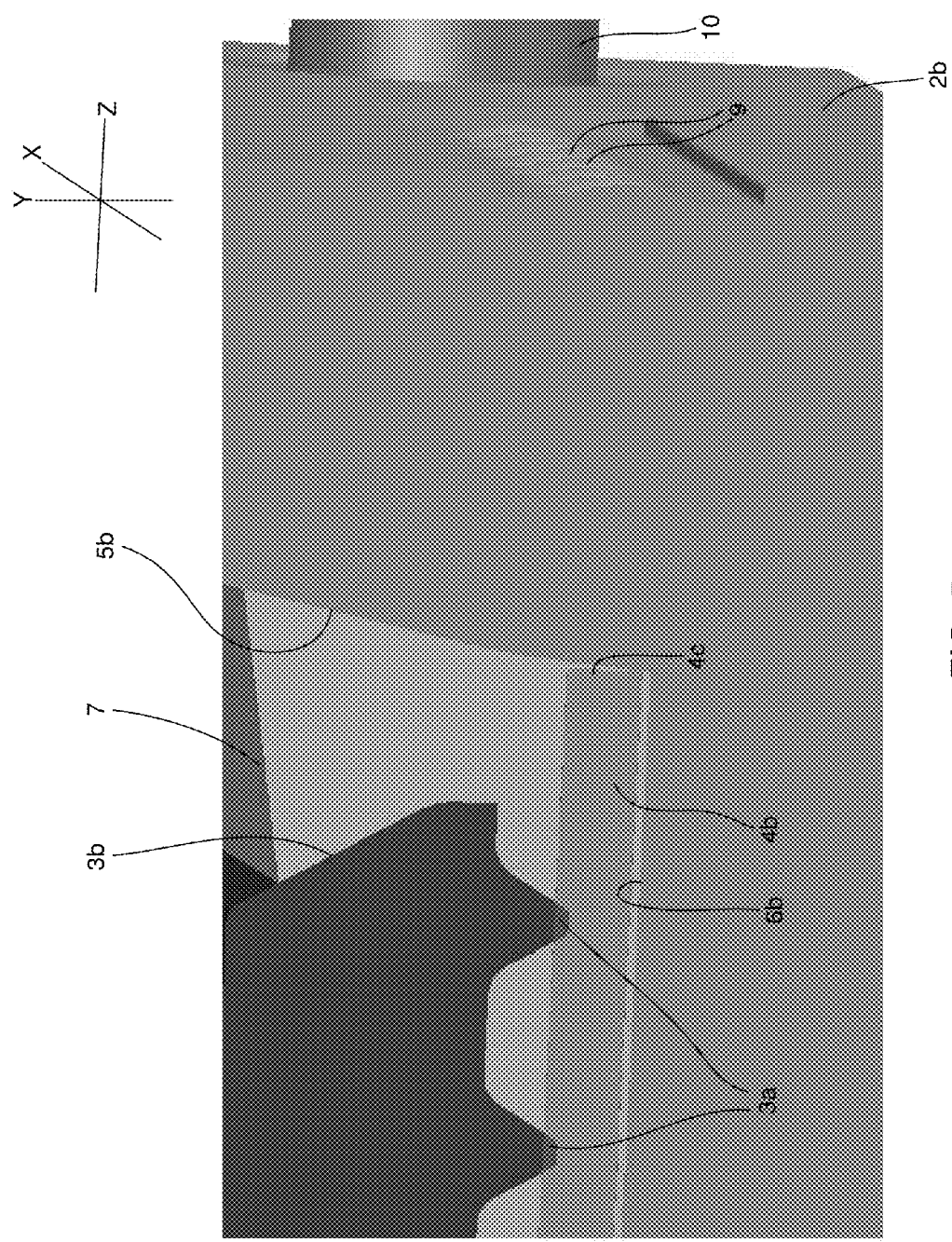
FIG. 5 illustrates an expanded view of the portion of the connector module that is within the dashed circle 13 shown in FIG. 4.
Figure 6:
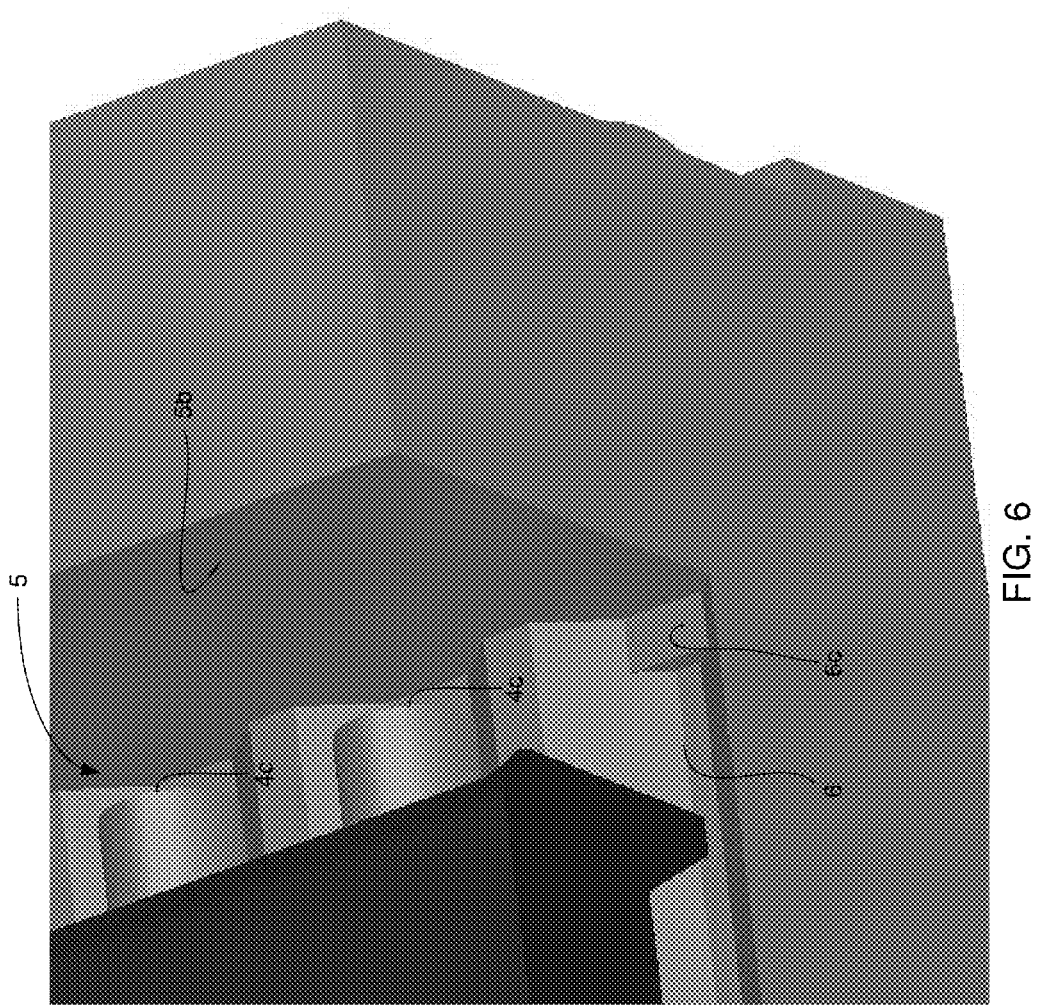
FIG. 6 illustrates an alternative embodiment of the module housing shown in FIG. 2.
Figure 7:
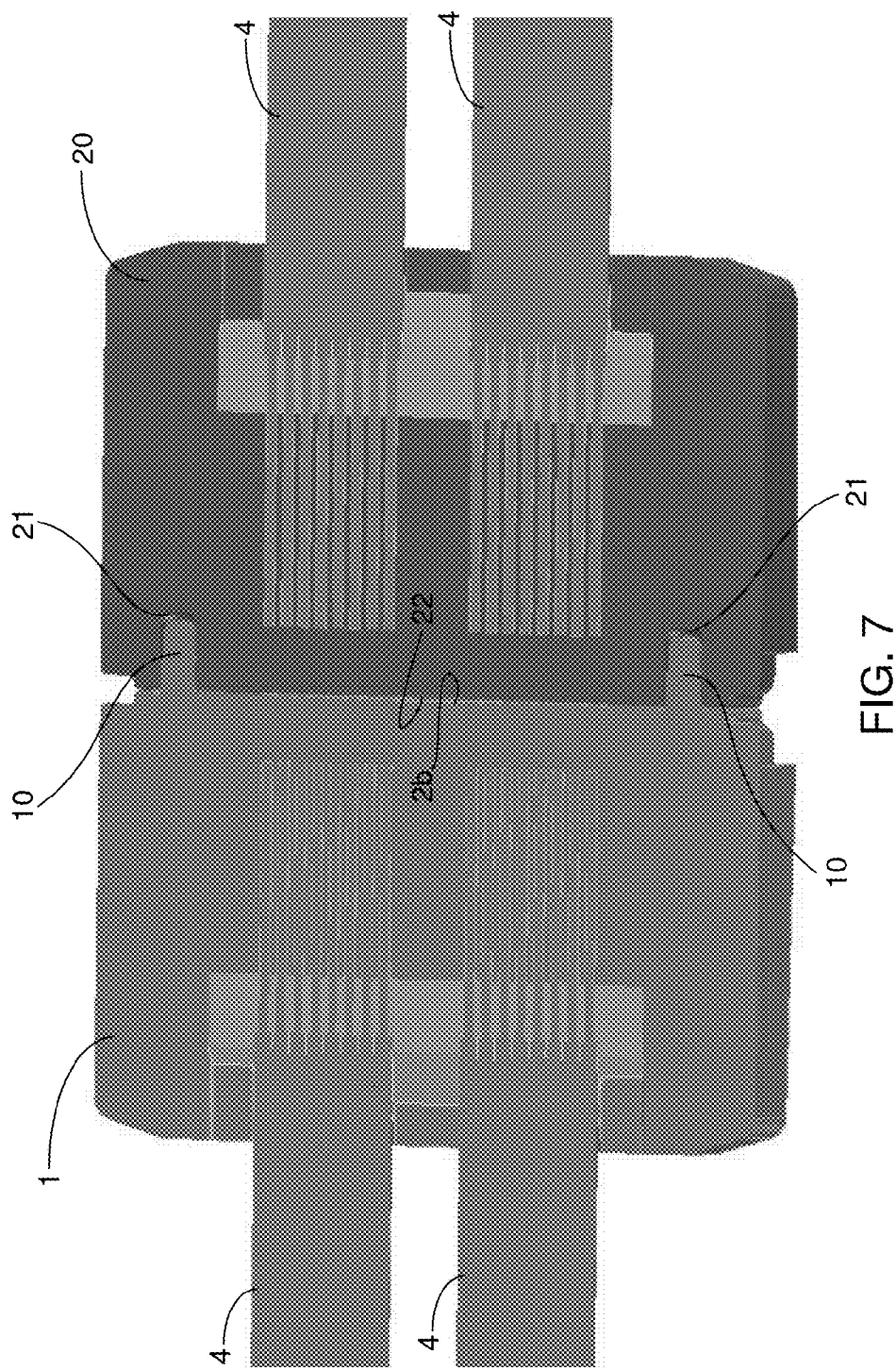
FIG. 7 illustrates a cross-sectional view of the multi-optical fiber connector module shown in FIG. 1 mated with a similarly-configured multi-optical fiber connector module.

FIG. 1 illustrates a side perspective view of the multi-optical fiber connector module 1 in accordance with an illustrative embodiment. The multi-optical fiber connector module 1 comprises a module housing 2 and a cover 3 and is shown in FIG. 1 connected to the ends of a plurality of optical fibers 4. FIG. 2 illustrates a top perspective view of the module housing 2 shown in FIG. 1 with the cover 3 and the optical fibers 4 removed. FIG. 3 illustrates a bottom perspective view of the module housing 2 shown in FIG. 2. FIG. 4 illustrates a cross-sectional side perspective view of the multi-optical fiber connector module 1 shown in FIG. 1. FIG. 5 illustrates an expanded view of the portion of the module 1 that is within the dashed circle 13 shown in FIG. 4. FIG. 6 illustrates an alternative embodiment of the module housing 2 shown in FIG. 2. FIG. 7 illustrates a cross-sectional view of the multi-optical fiber connector module 1 shown in FIG. 1 mated with a similarly-configured multi-optical fiber connector module 20. Characteristics and features of the multi-optical fiber connector module 1 will now be described with reference to FIGS. 1-7.

In accordance with this illustrative embodiment, there are a total of sixteen optical fibers 4 and the multi-fiber connector module 1 has sixteen respective optical pathways, although the invention is not limited with respect to the number of optical fibers that are connected to the connector module 1 or the number of optical channels that are provided in the connector module 1. The module housing 2 is typically a molded, unitary plastic part, although the invention is not limited with respect to the composition of the module housing 2. As will be described below in more detail, the cover 3 is deformable to an extent and is typically made of unfilled plastic such as, for example, unfilled polyvinyl chloride (PVC), unfilled polycarbonate, unfilled cyclic olefin copolymer (COC), or unfilled nylon.

The multi-optical fiber connector module 1 and the cover 3 have features that are similar or identical to features of a multi-optical fiber connector module and cover that are disclosed in U.S. Pat. No. 7,543,994 (hereinafter the '994 patent) and U.S. Pat. No. 7,553,091 (hereinafter the '091 patent), which are assigned to the assignee of the present application and which are incorporated by reference herein in their entireties.

As can be seen in FIG. 2, an upper surface 2a of the module housing 2 has a cavity 5 formed therein. The cavity 5 functions as an optical fiber holding chamber for holding the ends of the optical fibers 4 (FIG. 1). The cavity 5 has length, L, and width, W, dimensions (FIG. 2) that are approximately equal to, but slightly greater than, the length and width dimensions of the cover 3 (FIG. 1) so that the cover 3 can be gently placed in the cavity 5 with minimal force and held in place in the cavity 5 until the cover 3 has been secured in position with an adhesive material 7 (FIG. 1). The cavity 5 has a lower surface 5a in which a plurality of grooves 6 (FIG. 2) are formed. Each groove 6 has a first portion 6a and a second portion 6b. The first portions 6a of the grooves 6 are generally semi-cylindrical in shape such that they are complementary in shape to the cylindrically-shaped outer surfaces of the jackets of the optical fibers 4. The second portions 6b of the grooves 6 are V-shaped.

Prior to securing the ends of the optical fibers 4 within the cavity 5, each optical fiber 4 is cleaved and then a portion of the jacket is removed, leaving a jacketed fiber portion 4a and an unjacketed fiber portion 4b, as can be seen in FIG. 4. The jacketed fiber portions 4a of the optical fibers 4 are positioned in the first portions 6a of the grooves 6 and the unjacketed fiber portions 4b are positioned in the second portions 6b of the grooves 6. When the cover 3 is placed in the cavity 5, deformable features 3a disposed on the bottom of the cover 3 come into contact with the unjacketed fiber portions 4b of the optical fibers 4. The deformable features 3a are slightly deformed by the forces exerted by the unjacketed fiber portions 4b on the features 3a during placement of the cover 3 in the cavity 5. A soft sheet metal leaf spring (not shown) may be used during the placement process to apply an evenly-distributed force across the top surface of the cover 3 to cause the features 3a to be deformed. The deformed features 3a partially wrap around the unjacketed fiber portions 4b such that the unjacketed fiber portions 4b are pinned between the respective V-shaped second portions 6b of the grooves 6 and the deformed features 3a.

After the cover 3 has been placed and oriented in the cavity 5 of the module housing 2, as shown in FIGS. 1 and 4, the aforementioned adhesive material 7, which is transparent to the primary wavelength of the optical signals being carried on the optical fibers 4, is dispensed into a gap 8 that exists between a forward end 3b of the cover 3 and a front wall 5b that partially defines the cavity 5. The adhesive material 7 has an index of refraction that is equal to, or approximately equal to, the index of refraction of the cores (not shown) of the fibers 4. The adhesive material 7 fills any imperfections in the cleaved ends of the optical fibers 4, thereby making the joints transparent to the optical beams so that no internal reflection occurs at this boundary. When the adhesive material 7 is dispensed into the gap 8, it fills the gap 8 and flows between, and is in contact with, the bottom of the cover 3 and the unjacketed fiber portions 4b, as shown in FIG. 4. The adhesive material 7 is also in contact with the walls 5b, 5c and 5d (FIG. 2) that define the cavity 5. Thus, when the adhesive material 7 cures and becomes hardened, it fixedly secures the ends of the unjacketed fiber portions 4b within the respective V-shaped second portions 6b of the grooves 6 and fixedly secures the cover 3 to the lower surface 5a and to the walls 5b, 5c and 5d of the cavity 5.

As shown in FIG. 4, the ends of the unjacketed fiber portions 4b are adjacent to, or in contact with, the wall 5b of the module housing 2. Respective openings are formed in the module housing 2 that extend in the axial directions of the grooves 6 from the cavity 5 through the wall 5b and through a front surface 2b of the module housing 2. Within these openings, respective collimating lenses 9 are disposed in the front surface 2b of the module housing 2. First and second passive fine alignment features 10 extend from the front surface 2b of the module housing 2. The passive fine alignment features 10 are identical in structure to one another and have stepped cylindrical shapes made up of first and second cylindrical portions 10a and 10b, where the first cylindrical portion 10a has a diameter that is greater than a diameter of the second cylindrical portion 10b. The passive fine alignment features 10 are rounded where they transition from the second cylindrical portions 10b to their ends 10c. The passive fine alignment features 10 are designed to mate with respective openings formed in another module (not shown), as will be described below in more detail.

Providing the passive fine alignment features 10 with the stepped cylindrical shape shown in FIGS. 1-4 provides some advantages over using long tapered pins for this purpose. Tapered pins have the potential to stick as they are being inserted into the respective reciprocally-shaped tapered openings formed in the mating module. This potential to stick is due to the nearly-continuous contact that occurs between the surfaces of the tapered pins and the respective openings as they engage one another. If sticking occurs, it is possible that the respective passive fine alignment features will not fully engage one another, which can result in less than perfect misalignment.

One advantage of the stepped passive fine alignment features 10 is that there is less of a tendency to stick during insertion into the respective openings due to there being less surface-to-surface contact during insertion. This feature ensures that full mechanical coupling will occur, which ensures that precise optical alignment will be achieved. Another advantage is that the stepped cylindrical shapes are easier and less costly to manufacture than the tapered shapes.

With reference again to FIG. 1, a back side 2c of the module housing 2 has tapered snap features 2d and 2e located on opposite sides thereof. As will be described below in more detail, these tapered snap features 2d and 2e contribute to the ability of the connector module 1 to float when it is held within a plug (not shown) or receptacle (not shown). The term "float," as that term is used herein, is intended to denote a limited amount of movement of an object in the X- and/or Y- and/or Z-directions of the X, Y, Z Cartesian coordinate system shown in FIG. 1 relative to another object that is positioned in the same reference frame, as will be described below in more detail. The module housing 2 has retention features 2f and 2g located on opposite sides thereof that retain the connector module 1 within a receptacle (not shown) such that movement of the module 1 in the forward Z-direction indicated by arrow 12 (FIG. 1) is prevented while allowing some movement in one or more other directions, as will be described below in more detail.

With reference to FIG. 5, it can be seen that the wall 5b of the cavity 5 is curved, or tilted, relative to the X-Y plane. In contrast, the front surface 2b of the module housing 2 is in a plane that is parallel to the X-Y plane Likewise, the cleaved end face 4c of the fiber 4 is generally parallel to the X-Y plane. Consequently, the end face 4c only abuts the wall 5b at the lower edge of the end face 4c, but is otherwise spaced apart from the wall 5b by a small gap. This small gap ensures that the adhesive material 7 covers all, or substantially all, of the end face 4c, thereby making the joint transparent to the optical beam. This feature prevents internal reflections from occurring at the interface between the end faces 4c and the lenses 9.

FIG. 6 illustrates an alternative embodiment of the module housing 2 for providing a small gap between the end faces 4c of the fibers 4 and the wall 5b of the cavity 5 to ensure that the adhesive material 7 (not shown) covers all, or substantially all, of the end face 4c. In accordance with this embodiment, stops 6c are formed at the ends of the grooves 6 where the grooves 6 meet the wall 5b. The stops 6c are very small in size relative to the diameter of the unjacketed fiber portions 4 so that only the lower edges of the end faces 4c abut the stops 6c. The stops 6c cause a gap to be created between the end faces 4c and the wall 5b that ensures that the adhesive material 7 covers all, or substantially all, of the end face 4c, thereby making the joint transparent to the optical beam to prevent internal reflections from occurring.

FIG. 7 illustrates a cross-sectional view of the multi-optical fiber connector module 1 shown in FIG. 1 mated with a similarly-configured multi-optical fiber connector module 20. The manner in which the passive fine alignment features 10 disposed on the connector module 1 mate with respective complementary-shaped openings 21 formed in the module 20 can be seen in FIG. 7. The complementary-shaped openings 21 correspond to the passive fine alignment features of module 20. It can be seen that when the modules 1 and 20 are in the fully-mated configuration shown in FIG. 7, the front surface 2b of the module 1 is in abutment with a front surface 22 of the module 20 and the optical pathways of the modules 1 and 20 are in precise optical alignment with one another. The module 20 has lenses (not shown) that are identical to the lenses 9 of module 1 and that are in optical alignment with the lenses 9 when the modules 1 and 20 are in the fully-mated configuration shown in FIG. 7. The mating of the passive fine alignment features 10 and 21 effectuates the aforementioned fine alignment process, but the aforementioned coarse alignment process is effectuated by engagement of respective passive coarse alignment features (not shown) that are disposed on devices or structures that hold arrays, or banks, of the modules 1 and 20, as will be described below in detail.

FIGS. 8A and 8B illustrate front and back perspective views, respectively, of a multi-optical fiber connector module 30 that is identical in structure to the connector module 100 disclosed in the '091 patent. Therefore, a detailed description of the connector module 30 will not be provided herein. Like the connector module 1 shown in FIG. 1, the connector module 30 includes a cover (not shown) that is identical to cover 3 (FIG. 1) that is secured to the module housing 31 to hold the ends of the optical fibers (not shown) in place. In FIGS. 8A and 8B, the cover is not shown for ease of illustration.

The connector module 30 shown in FIGS. 8A and 8B has some features or elements that are identical to features of the connector module 1 shown in FIGS. 1-7. The connector module 30 has tapered snap features 31a and 31b that perform the same functions as the snap features 2d and 2e of module 1, i.e., allowing the module 30 to float to some extent. The connector module 30 has retention features 31c and 31d that perform the same functions as the retention features 2f and 2g of module 1, i.e., retaining the connector module 30 within a receptacle (not shown) such that movement of the module 30 in the forward Z-direction (arrow 32 in FIG. 8A) is prevented while allowing some movement in one or more other directions, as will be described below in more detail. The connector module 30 has tapered passive fine alignment features 33 that are different from the stepped passive fine alignment features 10 of the connector module 1, but perform the same fine alignment process described above with reference to passive fine alignment features 10.

Figure 9:
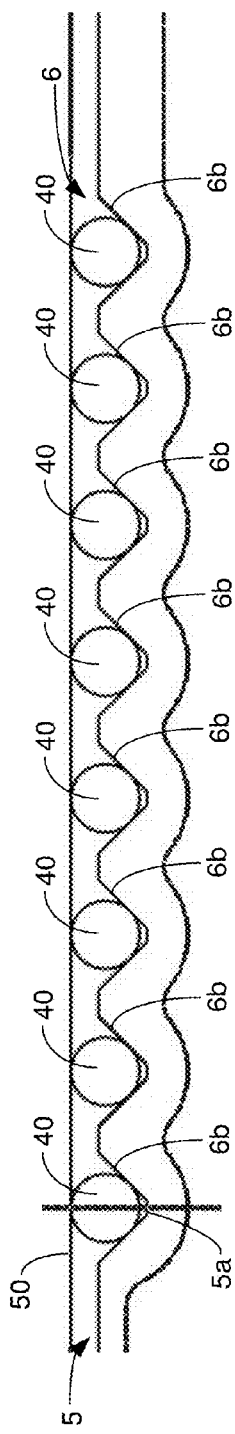
FIG. 9 illustrates a plan view of ends of a plurality of optical fibers positioned in the V-shaped second portions of the grooves of the module housing shown in FIG. 4.

The need to provide the cover 3 shown in FIGS. 1 and 4-6 with the deformable features 3a shown in FIG. 4 will now be described with reference to FIGS. 9 and 10. Further details of the cover will then be described with reference to FIGS. 11A and 11B. FIG. 9 illustrates a plan view of ends 40 of a plurality of optical fibers positioned in the V-shaped second portions 6b of the grooves 6 of the module housing 2 shown in FIG. 4. For illustrative purposes, the fiber ends 40 are illustrated as having the same diameter. The horizontal line 50 represents the bottom surface of a cover that is perfectly flat and does not include the deformable features 3a of the cover 3 shown in FIG. 4. For illustrative purposes, all of the V-shaped second portions 6b of the grooves 6 are shown as being identically dimensioned.

It can be seen in FIG. 9 that when all of the fibers have precisely the same diameter and all of the V-shaped second portions 6b are identically dimensioned, the bottom surface 50 of the cover makes equal contact with all of the fiber ends 40 so that they are held perfectly against the respective V-shaped second portions 6b of the grooves 6. In this case, it is not necessary to provide the cover with deformable features. Due to manufacturing tolerances, however, the fibers 40 typically will not have precisely the same diameter and the V-shaped second portions 6b of the grooves 6 will not have identical dimensions.

Figure 10:
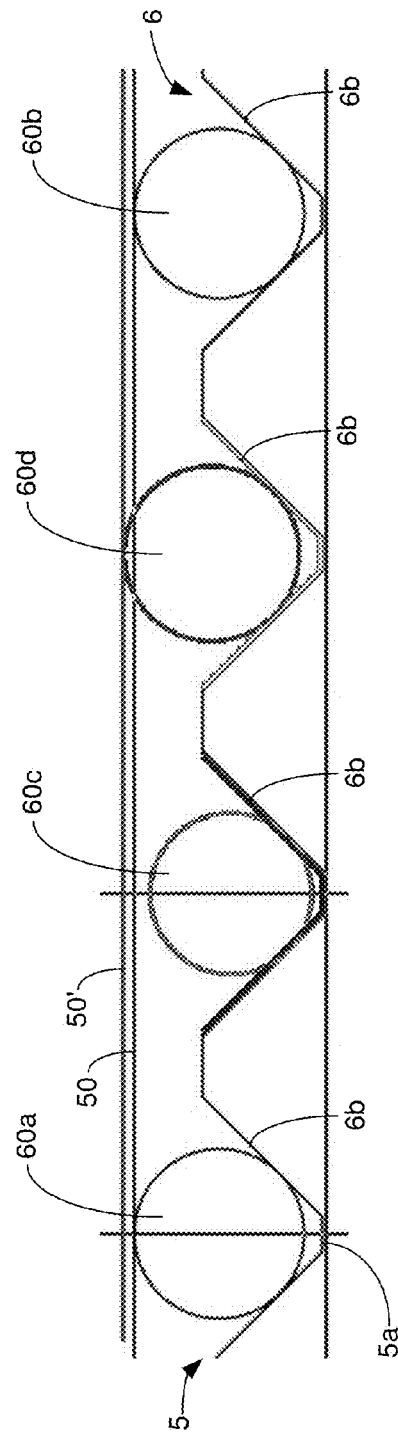
FIG. 10 illustrates a plan view of ends of a plurality of optical fibers positioned in the V-shaped second portions of the grooves of the module housing shown in FIG. 4.

FIG. 10 illustrates a plan view of ends 60 of a plurality of optical fibers positioned in the V-shaped second portions 6b of the grooves 6 of the module housing 2 shown in FIG. 4. For illustrative purposes, some of the fiber ends 60 are illustrated as having the different diameters and some of the V-shaped second portions 6b of the grooves 6 are shown as having slightly different shapes and/or sizes and/or positions. In FIG. 10, the two fiber ends 60a and 60b have the same diameters as the fiber ends 40 shown in FIG. 9. The fiber end 60c has a slightly smaller diameter than the fiber ends 40. The fiber end 60d has a slightly larger diameter than the fiber ends 40. The horizontal line 50 represents the location of the bottom surface 50 of the cover in FIG. 9 whereas the horizontal line 50' represents the new location of the bottom surface of the cover.

It can be seen in FIG. 10 that the bottom surface 50' of the cover is now farther away from the lower surface 5a of the cavity 5 than it was when the fiber ends 40 were perfectly sized to have equal diameters. The bottom surface 50' is now in contact only with fiber end 60d. Therefore, only fiber end 60d is pinned between the bottom surface 50' of the cover and the respective V-shaped second portion 6b of the groove 6. The other fiber ends 60a, 60b and 60c are floating loose. Consequently, it is possible that these fiber ends 60a, 60b and 60c will be pointed in directions that are not aligned with the optical pathways of the connector module 1 (FIG. 1). For example, assuming that the optical pathways are parallel to the grooves 6, the fiber ends 60a, 60b and 60c may be at non-zero degree angles to the optical pathways, which can lower optical coupling efficiency and cause signal degradation.

The problem described above with reference to FIG. 10 can be solved in different ways. One solution would be to use a separate cover for each optical fiber. Another solution would be to use spring or spring-type features on the cover to bias the fiber ends into position. However, both of these solutions would increase the overall cost of the connector module. In addition, using springs or spring-type features would increase the thickness of the connector module, which also is undesirable.

Figure 11B:
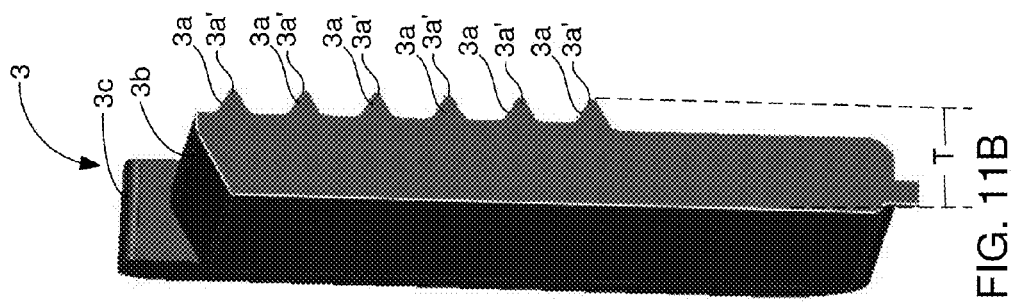
FIGS. 11A and 11B illustrate bottom and side cross-sectional views, respectively, of the cover shown in FIGS. 1 and 4-6.
Figure 11A:
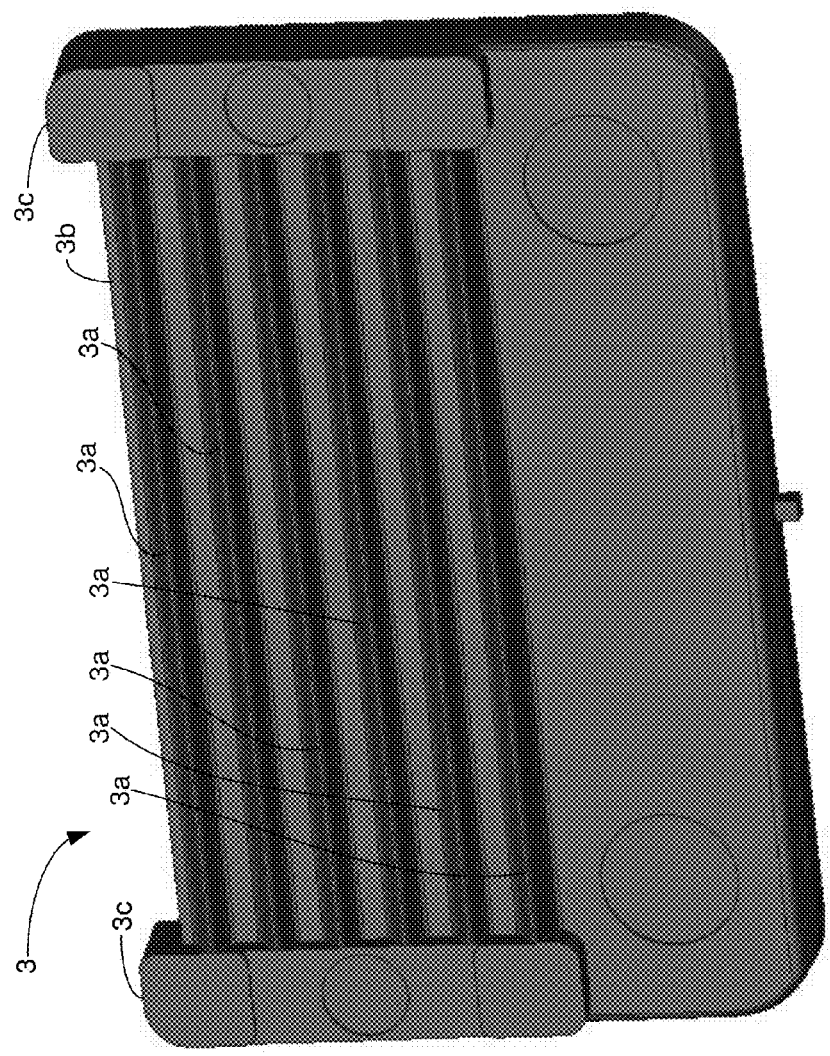

FIGS. 11A and 11B illustrate a bottom perspective view and a side cross-sectional view, respectively, of the cover 3 shown in FIGS. 1 and 4-6. In accordance with this illustrative embodiment, the deformable features 3a are ridges. The tips 3a' of each of the ridges 3a come into contact with all of the unjacketed fiber portions 4b (FIG. 4) such that each of the unjacketed fiber portions 4b is sandwiched, or pinned, between multiple tips 3a' of multiple ridges 3a and the respective V-shaped second portions 6b of the grooves 6. Having this many points of contact between the cover 3 and the fiber portions 4b ensures that the fiber ends will remain in alignment with the optical pathways of the module 1 (FIG. 4).

As indicated above, the entire cover 3 is a unitary molded part made of unfilled plastic such as, for example, but not limited to, unfilled polyvinyl chloride (PVC), unfilled polycarbonate, unfilled cyclic olefin copolymer (COC), or unfilled nylon. Making the cover 3 as a molded part of unfilled plastic ensures that the tips 3a' will quickly crush under low force as they come into contact with the unjacketed fiber portions 4b to permanently deform about the unjacketed fiber portions 4b without damaging the unjacketed fiber portions 4b. The tips 3a' have a lower hardness than the unjacketed fiber portions 4b so that the force that is required to permanently deform the tips 3a' is less than the force that is required to deform, or dent, the fiber portions 4b. This feature ensures that the tips 3a' will deform before any damage occurs to the unjacketed fiber portions 4b.

The permanent deformation of the tips 3a' about the fiber portions 4b ensures that the unjacketed fiber portions 4b will be firmly held in alignment with the respective optical pathways of the module 1. In addition, by employing features that permanently deform under low force rather than elastic features that perform spring-type functions, the cover 3 can have a very small thickness, T (FIG. 11B), and can be made thinner than if spring-type, or elastic, features were employed. This enables the cover 3 to be made at very low cost.

It can be seen in FIGS. 11A and 11B that the cover 3 has stops 3c formed on its forward end. These stops 3c come into contact with the inner surface of the wall 5b of the cavity 5 (FIG. 1) to provide the gap 8 that exists between the forward end 3b of the cover 3 and the wall 5b that partially defines the cavity 5. As described above, the adhesive material 7 is dispensed into the gap 8 and fills the gap 8 and flows between, and is in contact with, the bottom of the cover 3 and the unjacketed fiber portions 4b (FIG. 4). The adhesive material 7 is also in contact with the walls 5b, 5c and 5d (FIG. 2) that define the cavity 5 such that when the adhesive material 7 cures and becomes hardened, it fixedly secures the ends of the unjacketed fiber portions 4b within the respective V-shaped second portions 6b of the grooves 6 and fixedly secures the cover 3 to the lower surface 5a and to the walls 5b, 5c and 5d of the cavity 5. The ridges 3a perform an additional function of providing some distance between the bottom surface of the cover and the lower surface 5a of the cavity that allows the adhesive material 7 to flow more easily throughout the cavity 5 to make good contact with the walls 5b, 5c and 5d, the unjacketed fiber portions 4b and the bottom surface of the cover 3.

It should be noted that the invention has been described with reference to illustrative, or exemplary, embodiments in order to demonstrate the principles and concepts of the invention. As will be understood by those of skill in the art, the invention is not limited to the illustrative embodiments described herein. For example, the cover 3 is not limited to having the shape shown, although it preferably has a relatively thin profile. Although a few particular types of suitable plastic materials that may be used to make the cover 3 have been named herein for demonstrative purposes, the cover 3 is not limited to being made of any particular unfilled plastic material. Persons skilled in the art will understand, in view of the description provided herein, that a variety of modifications can be made to the embodiments described herein and that all such modifications are within the scope of the invention.

What is claimed is:

1. A multi-optical fiber connector module comprising: a module housing having a cavity formed therein for holding ends of a plurality of optical fibers, the cavity having a plurality of V-shaped grooves formed in a lower surface of the cavity,
   each V-shaped groove being adapted for holding an unjacketed portion of an optical fiber, each unjacketed fiber portion having a cleaved end; and a cover comprising an unfilled plastic molded part having a plurality of deformable features disposed on a lower surface thereof, wherein the cover has a shape that is adapted to fit within the cavity such that the deformable features come into contact with the unjacketed portions of optical fibers disposed within the cavity, wherein the deformable features have a lower hardness than the unjacketed portions of the optical fibers such that a force that is required to permanently deform the deformable features is less than a force that is required to permanently deform the unjacketed portions of the optical fibers, and wherein when the cover is positioned within the cavity, the deformable features permanently deform about the respective unjacketed portions of the optical fibers at locations where the deformable features come into contact with the unjacketed fiber portions such that the unjacketed portions are precisely located between the permanently deformed features and the respective V-shaped grooves.

2. The multi-optical fiber connector module of claim 1, wherein the unfilled plastic molded part is made of unfilled polyvinyl chloride (PVC).

3. The multi-optical fiber connector module of claim 1, wherein the unfilled plastic molded part is made of unfilled polycarbonate.

4. The multi-optical fiber connector module of claim 1, wherein the unfilled plastic molded part is made of unfilled cyclic olefin copolymer (COC).

5. The multi-optical fiber connector module of claim 1, wherein the unfilled plastic molded part is made of unfilled nylon.

6. The multi-optical fiber connector module of claim 1, wherein the deformable features are ridges, and wherein each ridge comes into contact with all of the unjacketed portions of optical fibers disposed in the cavity and is permanently deformed at each location where the ridge comes into contact with the unjacketed fiber portions.

7. The multi-optical fiber connector module of claim 6, further comprising:
   an adhesive material disposed in the cavity and in contact with walls of the module housing that define the cavity, ends of the unjacketed portions of optical fibers and the lower surface of the cover, the adhesive material securing the cover to the module housing, and wherein the adhesive material covers the cleaved ends of the unjacketed portions of optical fibers and is a transparent to an operating wavelength of light carried on the optical fibers.

8. The multi-optical fiber connector module of claim 7, wherein one of the walls that defines the cavity is a front wall that is adjacent the cleaved ends of the optical fibers, and wherein the front wall is at a non-zero degree angle to the ends of the optical fibers to provide a gap between the ends of the optical fibers and the front wall that ensures that the adhesive material will cover substantially all of the fiber ends.

9. The multi-optical fiber connector module of claim 7, wherein one of the walls that defines the cavity is a front wall that is adjacent the cleaved ends of the optical fibers, and wherein a lower edge of each fiber end abuts a respective stop formed on the lower surface of the cavity adjacent the front wall, and wherein abutment of the lower edges of the fiber ends with the respective stops provides a gap between the ends of the optical fibers and the front wall that ensures that the adhesive material will cover substantially all of the fiber ends.

10. A method for securing ends of a plurality of optical fibers to a multi-optical fiber connector module, the method comprising: providing a module housing having a cavity formed therein for holding cleaved ends of a plurality of optical fibers, the cavity having a plurality of V-shaped grooves formed in a lower surface of the cavity, each V-shaped groove being adapted for holding an unjacketed portion of one of the optical fibers; and
   positioning an unfilled plastic molded cover in the cavity, the cover having a plurality of deformable features disposed on a lower surface thereof, wherein the cover has a shape that is adapted to fit within the cavity such that the deformable features come into contact with the unjacketed portions of optical fibers disposed within the cavity, wherein the deformable features have a lower hardness than the unjacketed portions of the optical fibers such that a force that is required to permanently deform the deformable features is less than a force that is required to permanently deform the unjacketed portions of the optical fibers, and wherein when the cover is positioned within the cavity, the deformable features permanently deform about the respective unjacketed portions of the optical fibers at locations where the deformable features come into contact with the unjacketed fiber portions such that the unjacketed portions are precisely located between the permanently deformed features and the respective V-shaped grooves.

11. The method of claim 10, wherein the unfilled plastic molded part is made of unfilled polyvinyl chloride (PVC).

12. The method of claim 10, wherein the unfilled plastic molded part is made of unfilled polycarbonate.

13. The method of claim 10, wherein the unfilled plastic molded part is made of unfilled cyclic olefin copolymer (COC).

14. The method of claim 10, wherein the unfilled plastic molded part is made of unfilled nylon.

15. The method of claim 10, wherein the deformable features are ridges, and wherein each ridge comes into contact with all of the unjacketed portions of optical fibers disposed in the cavity and is permanently deformed at each location where the ridge comes into contact with the unjacketed fiber portions.

16. The method of claim 15, further comprising:
disposing an adhesive material in the cavity and in contact with walls of the module housing that define the cavity, with ends of the unjacketed portions of optical fibers and with the lower surface of the cover, the adhesive material fixedly securing the cover to the module housing, and wherein the adhesive material covers the cleaved ends of the unjacketed portions of optical fibers and is a transparent to an operating wavelength of light carried on the optical fibers.

17. The method of claim 16, wherein one of the walls that defines the cavity is a front wall that is adjacent the cleaved ends of the optical fibers, and wherein the front wall is at a non-zero degree angle to the ends of the optical fibers to provide a gap between the ends of the optical fibers and the front wall that ensures that the adhesive material will cover substantially all of the fiber ends.

18. The method of claim 16, wherein one of the walls that defines the cavity is a front wall that is adjacent the cleaved ends of the optical fibers, and wherein a lower edge of each fiber end abuts a respective stop formed on the lower surface of the cavity adjacent the front wall, and wherein abutment of the lower edges of the fiber ends with the respective stops provides a gap between the ends of the optical fibers and the front wall that ensures that the adhesive material will cover substantially all of the fiber ends.

* * * * *